Patented May 20, 1947

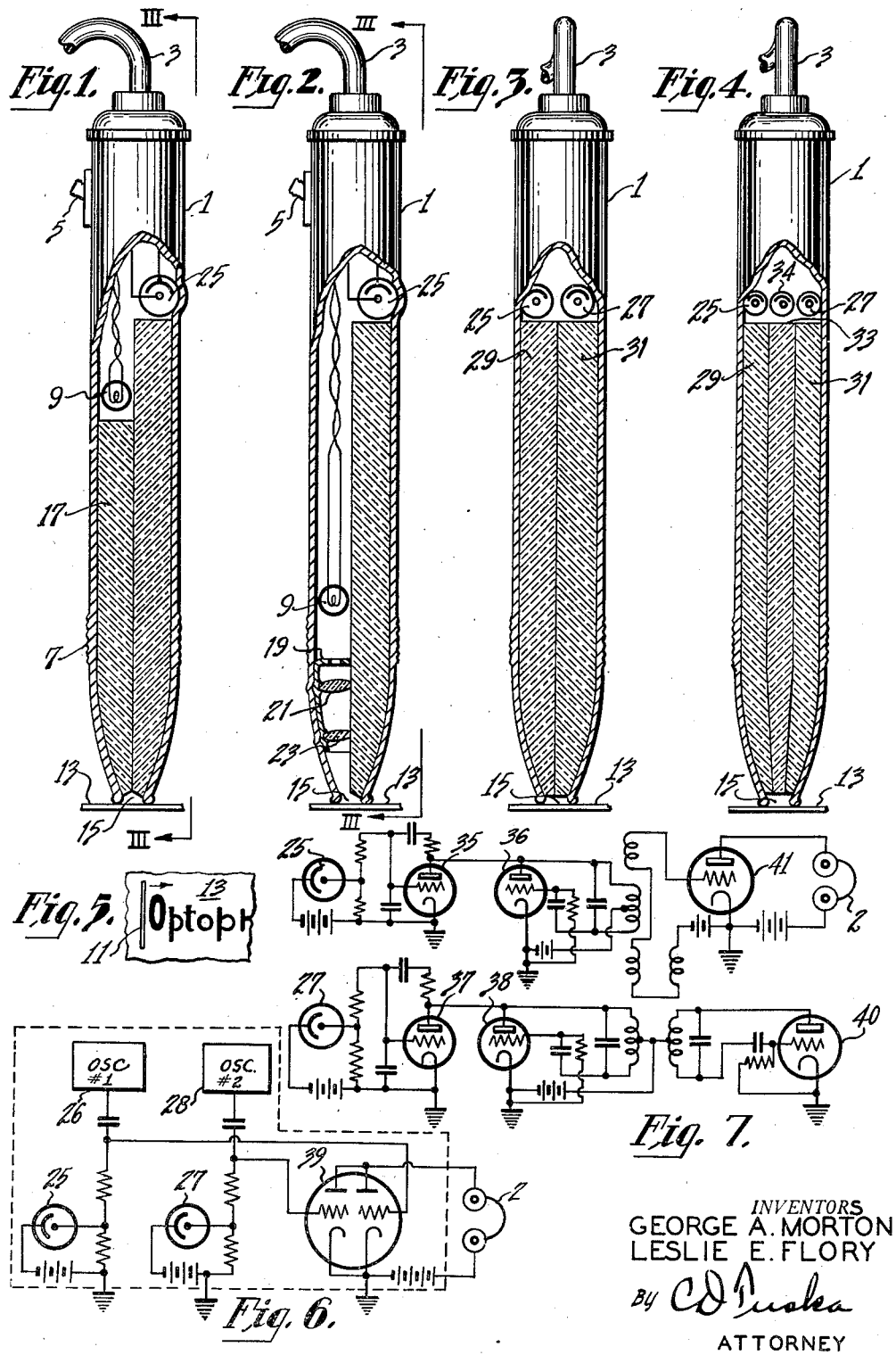

2,420,716

UNITED STATES PATENT OFFICE 2,420,716

READING AID FOR THE BLIND

George A. Morton and Leslie E. Flory, Princeton, N. J., assignors to Radio Corporation of America, a corporation of Delaware Application November 4, 1944, Serial No. 561,897

7 Claims. (Cl. 250—41.5)

This invention relates to the art of converting light energy into sound energy and has for its principal object to provide an improved method of and apparatus for enabling a blind person to locate and distinguish between different degrees of light through his sense of hearing and thus to read printed matter.

Reading machines (or "optophones" as such instruments are sometimes called) capable of translating ordinary printed matter into sounds distinctive of the individual letters and other characters have long been known but have never enjoyed the wide favor which they apparently merit. Among the factors inhibiting a wider use of such instruments is the cumbersome and complicated structure of the manually movable "pick-up" which contains the optical or electro-optical system. Thus, present day optophone pick-up units include, in addition to one or more lens elements, a rotating disc or a vibratile element or equivalent motor-driven mechanism for "scanning" the printed matter with as many as five beams of light.

Accordingly, another and specific object of the present invention is to provide a reading machine having no motor-driven parts, and one in which the hand-held unit or "pick-up" is comparable in size, weight and operating convenience to an ordinary fountain pen or vest pocket flashlight.

Still another object of the present invention is to provide a reading machine employing a single light beam, and one nevertheless capable of reading printed matter of any ordinary size of type, without adjustment, and without alignment problems characteristic of multiple-beam reading machines.

The foregoing and other objects are achieved in accordance with the method of the present invention by moving (e. g. manually) a vertically extending line-of-light across the (horizontal) lines of printed matter; picking up light reflected from each of a plurality of vertical segments or subdivisions of the illuminated area, converting said separately picked-up portions of the reflected light into electrical signals representative of the quantity of light picked-up from each of said sub-divisions, then combining said signals to provide a resultant signal, whereby when said line-of-light is moved across a printed character said resultant signal will be peculiar to that character, and then converting said resultant signal into sound.

Certain preferred details of construction and operation will be apparent and the invention itself will be best understood upon a reference to the following specification and to the accompanying drawing, wherein Fig. 1 is a side elevational view partly in section showing an optophone pick-up constructed in accordance with the principle of the invention.

Fig. 2 is a similar view showing an alternative pick-up within the invention.

Fig. 3 is a sectional elevation taken on a line III—III Fig. 1 or Fig. 2, and

Fig. 4 is a view similar to Fig. 3 but showing an alternative internal arrangement of the pick-up elements, and Fig. 5 is a fragmentary view in perspective of some printed matter which will be referred to in explaining the principle and describing the operation of the invention.

Figs. 6 and 7 are circuit diagrams showing two forms of reproducing circuits into which output of the "pick-up" may feed.

In the drawing wherein like reference characters designate the same parts and figures there is shown a "reading machine" comprising a pick-up device, indicated generally at 1 (Figs. 1-4 inclusive) and a "reproducer" (see Figs. 6 and 7) including an electrical circuit and one or more earphones, 2. The circuit including its batteries may, in the interest of convenience, be contained in a casing (not shown) adapted to be carried in a pocket in the operator's clothing. A cable 3 which projects from the upper end of the pick-up and a switch 5 which is convenient to the operator's fingers serve to connect the parts within the casing 1 to the electrical unit of Figs. 6 or 7.

The pick-up unit is designed to fit the human hand and, to this end, preferably comprises a tapered barrel or casing 1, say about 5 inches long, and similar to that of an ordinary fountain-pen. Like a fountain-pen or an automatic-pencil, the barrel 1 may be provided with a threaded outer portion 7 for engagement with the complementary internal threads of a dust cap (not shown).

The pen-like or pencil-like casing 1 contains a light source such, for example, as a miniature or "grain-of-wheat" electric bulb 9 and suitable means (later described) for projecting a narrow beam or line-of-light 11 (Fig. 5) upon the printed page or other surface 13 in the "vertical" direction, i. e. normal to the lines along which the printed matter is arranged. This may be done by conducting the light from the source 9 to an aperture 15 in the leading end of the pencil through a rod 17 constituted of "lucite," "plexiglas" (methyl methacrylate resin) or other material having the optical properties of quartz. This rod 17 is tapered to a narrow line at its lower end.

Alternatively, referring now to Fig. 2, the line-of-light 11 may also be obtained by projecting the image of a slit 19 onto the page 13 by means of a short focal length lens system 21, 23. In either case, the light reflected from the page 13 is picked-up and split in such a way that the light from the upper portion of the printed character, upon which the line-of-light 11 impinges, is directed to one photocell 25 and that from the base or lower portion is directed to a second photocell 27 (see Fig. 3). This may be done, referring still to Fig. 3, by collecting the light within the casing 1 on the ends of two "lucite rods 29 and 31 and conducting it back along these separate channels to the photocells 25 and 27, respectively. Alternatively, the reflected light may be picked up and impressed upon the said photocell 25 and 27 by means of a suitable lens-mirror system (not shown).

The output of the photocells 25 and 27 is used to control two separate oscillator-circuits 26 and 28 (Fig. 6) or 36 and 38 (Fig. 7). These oscillators may operate at two fixed frequencies as in Fig. 6, in which case, the amplitude of each of the oscillators 26 and 28 is preferably made inversely proportional to the light applied to its photocell so that when the line-of-light 11 is focused upon a white space no signal is received. Alternatively, as shown in Fig. 7, the separate frequencies of the two oscillators 36, 38 may be varied as by means of the reactance tubes 35 and 37 in proportion to the reflected light, the amplitude of each oscillator being constant. In the instant case the output of both of the tubes 36 and 38 beat with a single fixed oscillator 40 to give an audible frequency. Thus, in either case, as the pencil (1) is moved across the page 13 there are generated two signals, one varying with the character of the base of the letter and the other with the upper portion of the said letter or other character. These two electrical signals are mixed (in the tube 39, Fig. 6, or tube 41, Fig. 7) and applied to the earphone 2.

If desired, a more complete analysis of the print may be achieved by providing a third collector 33 and photocell 34 (see Fig. 4) for giving a separate indication of the character of the central portion of each letter to which the "pencil" is presented. In this case, of course, three oscillators would be required.

Various other modifications, embodiments and applications of the invention will suggest themselves to those skilled in the art. Accordingly, the foregoing should be interpreted as illustrative and not in a limiting sense except as required by the prior art and by the spirit of the appended claims.

What is claimed is:

1. A reading device pick-up comprising a source of light, means for deriving a line-of-light from said source and for directing it upon a printed surface to illuminate said surface in a direction normal to the direction of extension of said print, means for picking-up light reflected from a first segmental area of said illuminated surface, separate means for picking up light reflected from a second segmental area of said illuminated surface, and means for converting said separately picked-up light into electrical signals representative of the light picked up from each of said segments.

2. The invention as set forth in claim 1 and wherein said first mentioned means comprises a rod-like element constituted of a material having the optical properties of quartz, one end of said rod being presented to said light source and the other end being so shaped and positioned as to focus said light upon said printed surface in the said pattern.

3. The invention as set forth in claim 1 and wherein said first mentioned means comprises an optical lens system of short focal length.

4. The invention as set forth in claim 1 and wherein said means for picking-up light from each segmental area of said illuminated printed surface comprises a rod-like element constituted of a material having the optical properties of quartz.

5. The invention as set forth in claim 1 and wherein said means for converting said separately picked-up light comprises a plurality of photo sensitive elements each individual to one of said light pick-up means.

6. An optophone pick-up comprising a pencil-like casing containing: a source of light, means for deriving a line-of-light from said source and for projecting it from said casing upon a printed surface in a direction normal to the direction of extension of said print, a plurality of photocells, means for separately and independently picking-up light reflected from each of a plurality of relatively fixed vertical segments of said illuminated surface and for transmitting said separately picked-up light to respective ones of said photocells, whereby to convert said separately picked-up light into electrical signals representative of the light picked up from each of said segments of said illuminated surface.

7. A method of enabling a blind person to locate and to distinguish degrees of light through his sense of hearing and thus to read printed matter, said method comprising directing light upon a vertically extending area of the printed surface sufficiently narrow to embrace only a portion of one of the characters of which said printed matter is comprised, then separately and independently picking-up light reflected from each of a plurality of relatively fixed sub-divisions of said illuminated vertical area, converting said separately picked-up light into electrical signals representative of the light picked-up from each of said sub-divisions of said illuminated area, respectively, then combining said signals to provide a resultant signal whereby when the light which is directed upon said surface is moved across a printed character said resultant signal will be peculiar to that character, and then converting said resultant signal into sound.

GEORGE A. MORTON.
LESLIE E. FLORY.

REFERENCES CITED

The following references are of record in the file of this patent:

UNITED STATES PATENTS

| Number | Name | Date |
|---|---|---|
| 1,350,954 | Barr et al. | Aug. 24, 1920 |
| 1,798,118 | Clifton | Mar. 24, 1931 |
| 1,390,883 | Case | Sept. 13, 1921 |
| 1,352,940 | Brown | Sept. 14, 1920 |
| 1,320,366 | Houskeeper | Oct. 28, 1919 |
| 1,542,937 | Hammond, Jr. | June 23, 1925 |
| 1,550,197 | Berry | Aug. 18, 1925 |
| 1,897,141 | Peters | Feb. 14, 1933 |
| 1,791,794 | Chesney | Feb. 10, 1931 |
| 1,751,584 | Hansell | Mar. 25, 1930 |

OTHER REFERENCES

Radio News, pp. 723, 750, Feb. 1930.
Power Plant Engineering—Weston Electrical Instrument Corp., pp. 295, 297, July 1933.